Figure 1:
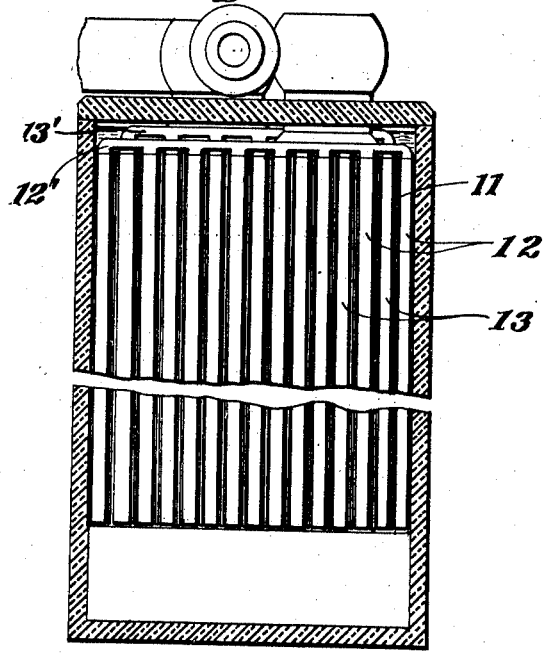

R. W. WALES.
STORAGE BATTERY.
APPLICATION FILED FEB. 24, 1920.

1,366,223.

Patented Jan. 18, 1921.

Inventor
RALPH W. WALES.
by Mitchell Chadwick Kent
Attorneys.

UNITED STATES PATENT OFFICE.

RALPH W. WALES, OF AUBURNDALE, MASSACHUSETTS, ASSIGNOR TO ANDREAS HARTEL, JR., GEORGE H. BURNETT, AND OSCAR R. HARTEL, COPARTNERS DOING BUSINESS AS HARTEL BROTHERS & CO., OF BOSTON, MASSACHUSETTS.

STORAGE BATTERY.

1,366,223.  Specification of Letters Patent.  Patented Jan. 18, 1921.

Application filed February 24, 1920. Serial No. 360,705.

*To all whom it may concern:*

Be it known that I, RALPH W. WALES, a citizen of the United States, residing at Auburndale, in the county of Middlesex and State of Massachusetts, have invented certain new and useful Improvements in Storage Batteries, of which the following is a specification.

This invention relates to improvements in storage batteries. More particularly it relates to the means for separating the plates of a storage battery. It is an object of the invention by providing an improved separator to increase materially both the life and the capacity of the ordinary storage battery. In such batteries as now constructed it is customary to use glass or wooden separators; but the glass cannot be used in automobiles, owing to the great liability of fracture from shock; and the wood becomes gradually permeated by lead, or eaten or weakened by acid so that at some weak point a short circuit occurs that could not reasonably be foreseen. It is one object of the invention to eliminate these uncertainties and thus to add to the assured life and utility of the storage battery by the provision of separators which are free from the defects stated, inasmuch as none of the various devices that have been employed or proposed to remedy this recognized evil have the advantages which characterize the present invention so far as I am aware. Another object of the invention is to increase the capacity of a storage battery cell by providing a separator which can be used successfully with great thinness, thus permitting the introduction of a larger number of standard plates into the battery cell, than is possible in present practice, without changing the exterior dimensions thereof. It is also the object of the invention to provide the other advantages that are incidental to the construction hereinafter disclosed. These objects are accomplished by providing non-conducting separators which are non-brittle, relatively of extreme thinness, and preferably are flexible, being, for example, of the thickness and flexibility of stiff paper, and being between .01 and .02 inch in thickness. To this end, they may be made of paper, cloth, or the like, impregnated with an acid-resisting gum. The gum may be either a natural gum or preferably a synthetic gum. Paper, for example, being saturated with this material in liquid form, and the whole converted into a solid, flexible sheet, such sheets may be inserted between the active plates of an electric storage battery, the plates being separated only by these sheets. Suitable looseness may be allowed for liquid to get at the whole face of each plate, or the separators may be corrugated slightly if desired. The invention may be embodied in various materials and forms, one being herein described as an illustration. It is intended that the patent shall cover, by suitable expression in the appended claims, whatever features of patentable novelty exist in the invention disclosed.

Figure 2:
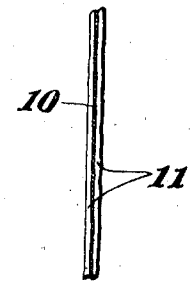

In the accompanying drawing:

Figure 1 is an end elevation, somewhat diagrammatic, in section through a single cell of a storage battery just inside of the wall showing the plates and separators; and Fig. 2 is an enlarged similar elevation in diagram of one of the separators.

Referring to the drawing, 10 indicates a sheet of paper and 11 a synthetic gum which may, for example, be the solidified reaction product of a polymerizable oil and a sulfonate such as is shown in Letters Patent No. 1,251,863, for rubber substitute and process of making the same, issued to William W. Carter. The material thus described may be spread in pulverized or granular form above and below a sheet of paper laid in a mold, and the whole may then be subjected to the hot and cold pressing process producing a uniform distribution of the gum material and causing it to permeate and fill and solidify in the pores of the paper. Whether the paper occupies the exact middle or lies more to one side or the other of the resulting mass is immaterial because in either case it does not constitute the whole of the thickness, there being everywhere an excess of the gum material so that there is everywhere on one side or the other, or on both sides of the paper as well as in the pores of the paper, a continuous body of the gum. Such a product being unaffected by acid and being also a non-conductor of electricity, needs only to be thick enough to have the necessary physical strength in order to serve as a separator with perfect results for an indefinite period of time without deterioration, except such as may come from physical abrasion. Applying the invention to a cell of ordinary size having the usual eleven active plates about 1/8" thick, and for the usual separators of about 1/16 inch thickness substituting the separators of the invention made with the thickness of 17/1000 inch, or about 1/60 inch, there is enough saving in space to allow the introduction of four additional plates and separators, thus increasing the capacity of the cell about 40%. At the same time, the danger of breakage and of early short circuiting of separators is eliminated, for the separator is tough, i. e., non-brittle, and has its pores filled with the tough resisting material and its surface incased therewith so that there is no opportunity for the lead to "grow" or "tree" through the separator.

While the use of a carrier or holder such as paper or cloth for the acid-resisting gum is preferable, the gum may be used alone. The separators may, of course, be made of any thickness. To provide for access of the electrolyte for the whole of the surface of the plates, the separating sheets may be corrugated if in any case it is not sufficient to use plane sheets loosely packed. The flexibility, when flexible separators are used, permits of the separator bending as necessary to accommodate plates that have buckled somewhat, which is not possible with glass.

Other synthetic gums or resins may be employed, and any suitable fibrous or cellular material may be employed to fill a relatively thick sheet or to give tenacity to a thin sheet; while in any case where thinness is of no importance it may be sufficient to use wood or the like with the gum coating or deeply penetrating its surfaces, but not completely filling the same.

In the accompanying drawings, the simple form is shown of a plane sheet of paper 10 impregnated and coated on both sides with a body of a gum 11 as described. The mold which forms this may be of any shape, plane or otherwise, regular or irregular; and it is not deemed necessary to illustrate a corrugated shape, or any other that may be chosen. When installed in the cell of a storage battery, the active, positive and negative, plates 12, 13, are arranged alternately in the usual way, but more closely together than heretofore in order to get the full advantage of the present invention, thus illustrating in a cell of any particular width, for example 2½ inches, the insertion of more than the present standard number of active plates.

In the battery illustrated, there may be fifteen plates of the standard thickness and fourteen spaces between them approximating .06 of an inch; and the acid-resisting separators 11 may be then each .03 of an inch thick with ample looseness for liquid on each side of them. Preferably each separator is a plane sheet; and when this style is used the separator presents a solid surface to the face of each active plate at an average distance therefrom of .015 of an inch. This is so close that it prevents the falling out of the paste or material from the plate. Even when loosened, such material is inclined to stay in place resting against the separator and prevented thereby from falling out and settling to the bottom. The acid-resistant separators of the invention are effective to prevent the destruction of a battery by a buckling of plates, and effective to limit the buckling, for inasmuch as the acid does not soften the material of the separator so that the same can be pushed aside by the physical pressure of one plate toward another it prevents the making of a short circuit by excessive buckling, and thus limits the buckling to that which may occur from the taking out of current from a battery in the ordinary way.

The making of the battery as thus described is preferred because of the extra capacity and because of the function of the separator when thus organized with the other elements in preventing the escape of active material from the plates. But it has been found experimentally that for ordinary purposes it is not necessary to use the relatively expensive pressing process above set forth. A method which is, therefore, preferred for most purposes is to start with paper, which may be ordinary wrapping paper, or for a greater thickness ordinary "weather paper," such as it is customary to use in roofing for laying under shingles, etc., and to prepare a bath composed of the desired gum dissolved in alcohol or other solvent. The paper may then be dipped into the bath, allowed to drip, and then dried for a short time, for example, half an hour, at a low heat, for example 70° C. and afterward baked for a period which may range from one to three hours according to the thickness of the material at a temperature in the vicinity of 120° C. This process produces a product not much thicker than the paper was, and which would be represented by Fig. 2 if the thickness of the side areas 11 were reduced, each to a thickness considerably less than the thickness of the central web 10 of paper. In the finished product the acid-resistant gum permeates the paper and thinly covers its surface, while the individual fibers of the paper being thus protected from attack by the acid, and being sufficiently non-continuous even if any of them be by abrasion rendered liable to attack, are not an element of weakness, but are on the contrary an element giving an increased degree of tenacity to the material, or may be such, if proper paper is chosen, and constitute a filler which reduces the cost of the product as a whole materially below what it would be if the separator were made solely of the acid-resisting gum. For these purposes, paper, canvas, felt, wood, or any absorbent material of like nature may be used; and for the gum any acid-proof gum, of which examples are found in that above referred to, and in the products which are commercially known as bakelite, condensite and redmanol, which are phenol-formaldehyde condensation products; or any acid-resistant natural gum product, of which asphalt may be an example, might be employed.

In operation, the life of the battery is prolonged beyond batteries previously known to me, because of the introduction between the plates of the acid-resisting barrier which resists acid in the sense that it is not softened or rendered physically less strong by the effect of the acid with the result that the buckling and strong pressure applied to it by the plates does not squeeze it out of position and permit the plates to touch. In addition to this increase of length of life, a cell of the battery may either have materially increased capacity, or may be greatly reduced in size for a given capacity as compared with present practices.

I claim as my invention:—

1. The combination, with the active plates and the electrolyte, in a storage battery, of a separator arranged between adjacent plates and comprising a sheet of porous material, susceptible of attack by acid, impregnated and coated with an acid-resistant non-conducting gum.

2. The combination with the active plates and the electrolyte, in a storage battery, of a separator arranged between adjacent plates and comprising a sheet susceptible of attack by acid, coated with an acid-resistant non-conducting gum.

3. The combination, with the active plates and the electrolyte, in a storage battery, of a separator arranged between adjacent plates and comprising a non-brittle sheet associated throughout its extent with a layer of acid-resisting gum adhering thereto.

4. A storage battery comprising the combination, with an electrolyte, of active plates and paper-thick separators arranged between adjacent plates and comprising acid-resistant non-conducting material.

Signed at Boston, Massachusetts this 18th day of February, 1920.

RALPH W. WALES.